United States Patent
Van Der Tol

(10) Patent No.: US 9,918,454 B2
(45) Date of Patent: *Mar. 20, 2018

(54) METHOD OF AND DEVICE FOR GENERATING AN ATTENTION INDICATION FOR A DAIRY ANIMAL

(71) Applicant: LELY PATENT N.V., Maassluis (NL)

(72) Inventor: Patrick Philip Jacob Van Der Tol, Amersfoort (NL)

(73) Assignee: LELY PATENT N.V., Maassluis (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,652

(22) Filed: Jun. 25, 2015

(65) Prior Publication Data

US 2015/0289486 A1 Oct. 15, 2015

Related U.S. Application Data

(63) Continuation of application No. 13/360,815, filed on Jan. 30, 2012, now Pat. No. 9,095,114, which is a (Continued)

(30) Foreign Application Priority Data

Jul. 29, 2009 (NL) ..................... 1037156

(51) Int. Cl.
 *A01J 5/007* (2006.01)
 *A01K 29/00* (2006.01)
 *A01J 5/013* (2006.01)

(52) U.S. Cl.
 CPC ............ *A01K 29/005* (2013.01); *A01J 5/007* (2013.01); *A01J 5/013* (2013.01)

(58) Field of Classification Search
 CPC .................... A01K 29/005; A01J 5/007
 (Continued)

(56) References Cited

U.S. PATENT DOCUMENTS 5,704,311 A 1/1998 Van Den Berg
6,776,119 B2 8/2004 Vijverberg et al.
(Continued)

FOREIGN PATENT DOCUMENTS

EP 0677243 A2 10/1995
WO 9925176 A1 5/1999

OTHER PUBLICATIONS

Search Report for priority document NL1037156 dated Mar. 19, 2010.
(Continued)

*Primary Examiner* — David J Parsley
*Assistant Examiner* — Danielle A Clerkley
(74) *Attorney, Agent, or Firm* — Hoyng Rokh Monegier LLP; Ramin Amirsehhi; David P. Owen

(57) ABSTRACT

A method and device are provided for generating an attention indication for a dairy animal that is kept in an environment with a freely accessible robotic milking system, including measuring a plurality of visit intervals, milking intervals, respectively of said dairy animal, determining a value of a statistical parameter regarding the measured plurality of intervals from the measured intervals, generating the attention indication, in particular a mastitis alarm signal, if the value exceeds a predetermined threshold value. Valuable information can be derived from the spread of, or change in, the values.

4 Claims, 2 Drawing Sheets

Related U.S. Application Data continuation of application No. PCT/NL2010/000117, filed on Jul. 21, 2010.

(58) Field of Classification Search
USPC .............................. 119/14.02, 41.08, 14.14
See application file for complete search history.

(56) References Cited

U.S. PATENT DOCUMENTS

| | | |
|---|---|---|
| 8,567,344 B2 | 10/2013 | Van Der Tol et al. |
| 2002/0152962 A1 | 10/2002 | Fransen |
| 2003/0226508 A1 | 12/2003 | Theelen |
| 2005/0217587 A1* | 10/2005 | Nelson ............... A01J 5/01 119/14.02 |
| 2010/0170445 A1 | 7/2010 | Gerrit |
| 2013/0269618 A1* | 10/2013 | Song ............... A61D 17/002 119/14.08 |

OTHER PUBLICATIONS

International Search Report for PCT/NL2010/000117 dated Nov. 3, 2010.
International Preliminary Report on Patentability for PCT/NL2010/000117 dated Jan. 31, 2012.

\* cited by examiner

METHOD OF AND DEVICE FOR GENERATING AN ATTENTION INDICATION FOR A DAIRY ANIMAL

CROSS REFERENCE TO RELATED APPLICATIONS

This application is a continuation of U.S. patent application Ser. No. 13/360,815 filed on 30 Jan. 2012, which is a continuation of PCT application number PCT/NL2010/000117 filed on 21 Jul. 2010, which claims priority from Netherlands application number NL 1037156 filed on 29 Jul. 2009. All three applications are hereby incorporated by reference in their entireties.

BACKGROUND OF THE INVENTION

1. Field of the Invention

The invention relates to a method of generating an attention indication for a dairy animal that is kept in an environment with a freely accessible robotic milking system. The invention also relates to a device for carrying out said method.

2. Description of the Related Art

With robotic milking systems, i.e. systems in which dairy animals are milked fully automatically, the dairy animals are kept in an environment in which they determine themselves the point of time of visiting the robot, in particular the point of time of milking, without constant human supervision. It is therefore of importance to be able to detect abnormalities, or at least abnormalities that demand attention, in a reliable manner, so that appropriate action can be taken.

In the state of the art, many methods and systems are known to monitor the physical condition or deviations therefrom. Examples thereof are milk conductivity meters, milk colour meters and the like for mastitis detection, step counters or thermometers and the like for heat, etcetera.

A drawback of the known methods and systems is that they often make use of one or more measuring devices, which do not always function in an accurate and/or reliable manner. At any rate, such a meter also results in an increased complexity of the robotic milking system.

BRIEF SUMMARY OF THE INVENTION

It is an object of the invention to provide a very simple method and device, in which the above-mentioned drawback is at least partly obviated.

For this purpose, the invention provides a system and method of generating an attention indication for a dairy animal that is kept in an environment with a freely accessible robotic milking system. The method comprises the steps of measuring a plurality of visit intervals, in particular milking intervals, of said dairy animal, determining a value of a statistical parameter regarding the measured plurality of intervals from the measured intervals, and generating the attention indication if the value exceeds a predetermined threshold value. The inventor has discovered that the variation in the visit intervals, in particular in the milking intervals, i.e. the period of time between two successive visits, milkings, respectively, is a parameter that can provide useful information about a health condition, and can provide an indication for further attention. In particular, if the variations become too large, this is an indication for concern, in other words an attention indication.

In this application, by 'attention indication' is meant an indication or message to examine the physical condition of a dairy animal, for example because the animal is suspected to have a specific medical condition. An example of such an attention indication is a so-called attention message, i.e. a listing in a management system or animal management system, or an alarm message in cases that demand immediate attention.

A great advantage of the invention is that only time is measured, of which the reliability is beyond all doubt. The measuring can be carried out as the measuring of visit points of time, milking points of time, respectively, and the determining of the interval from the differences between the points of time, or, for example, as the direct measuring of the interval by means of a clock. Usually, a time measuring device is already present in most automated systems, so that the complexity will not increase. There are thus provided a very simple method and device for the desired indicator function.

It is explicitly pointed out here that in what follows the term 'visit intervals', or in general 'intervals', may be used. Some visits may not result in a milking, for example because the interval is smaller than the minimum interval allowed, or because the milking is not successful due to stress or the like. Nevertheless, such visits, and the statistical information to be extracted therefrom, can often be used as indicator signals. The term 'milking interval' or 'interval' should be read in all cases as 'milking interval or visit interval'. Likewise, the term 'milking' should be read as 'visit and milking'. Since, in practice, actually successful milkings provide more, at least more reliable, information than the complete set of visits, which can thus also comprise immediate revisits and the like, the species 'milking interval' is the advantageous variant of the genus 'visit' for the present invention.

The intervals are preferably successive intervals. This results in an image that is as complete as possible, without e.g. variations being overlooked. The reliability can thus be enhanced. However, in principle it is possible to take only a non-successive sub-collection of intervals into consideration.

However, it is also possible to take non-successive intervals into consideration. For example, a milking interval in which the cow has been fetched will not represent natural behaviour and will, as a result thereof, not belong to the series of intervals in the case of voluntary visits to the milking robot. The series is then interrupted for that milking. However, this can be met in a simple manner by considering the milking intervals as purely statistical quantities, just like the spread thereof, for example with the standard deviation thereof. A larger standard deviation then also denotes an attention indication.

The attention indication comprises in particular a mastitis alarm signal. The inventor has discovered that variation can be a useful indicator, in particular for mastitis. Precisely in the case of a very important medical condition like mastitis, it is of major importance to have a reliable, whether or not additional, indicator. However, it is also possible to formulate useful criteria for other situations, such as lameness, ketosis and the like.

In embodiments, at a new visit, a new milking, respectively, the parameter is updated for all visits, milkings, respectively, that took place until then, in particular in the current lactation. This means that the parameter is calculated again, but now on the basis of all visits, milkings, respectively, that took place until then. The effect of the new measured milking interval is then included in the total image.

In embodiments, at a new visit, a new milking, respectively, the parameter is updated over the past N visits/milkings, wherein N is a predetermined number. In this embodiment, it is thus looked at the past N visits/milkings, in the form of a progressive average. As a result thereof, a development or change of the parameter over time is obvious and can also be established relatively quickly. By the smaller number of points, relative to the aforementioned embodiments, the reliability is sometimes affected.

In this invention, the parameter is related to the variation in the intervals. The parameter comprises in particular the standard deviation of the measured intervals. The standard deviation is a simple, clear and very useful parameter to indicate spread. A large spread provides a large standard deviation.

In embodiments of the invention, the intervals are set out as a collection of points having one of the measured intervals as the x-coordinate and having the subsequent or previous measured interval as the y-coordinate, wherein a measure for the spread of the points with respect to an average is taken as the parameter. By thus setting out the successive intervals in a diagram, there is created a 'cloud of points'. It should be noted that, in the case of larger numbers of measurements, it does not matter, from a statistical point of view, whether the subsequent or the previous interval is taken as the y-coordinate. The inventor has discovered that in particular cows having mastitis have a more irregular way of visiting the milking robot than healthy cows. This is expressed in a broader cloud of points for mastitis cows than for healthy cows. As, in the case of completely regular intervals, all points of the cloud of points coincide, any irregularity will be clearly visible. Said average is situated in particular at a point having as coordinates the respective average x and y-coordinates. In particular, if the number of intervals over a not too long period of time, such as a few weeks, is taken into consideration, this will be a good approach in practice.

In practice, a complete regularity in the (milking) intervals will not occur if measurement takes place over a longer period of time than, for example, a few weeks, because the milk production and/or the milking frequency are not constant. For example, in the beginning of the lactation, the milk production will first have to start, whereas, in the last months of the lactation, the milk production will slowly decrease. The number of milkings, and consequently the average milking interval, will then have a pattern over the lactation period. This means that the progressive average of the milking intervals will also have a pattern. The initially round cloud of points will then be stretched to roughly an oval. Accordingly, in a particular embodiment, said average is formed by a linear regression line through the points. In this manner, this circumstance can be taken into account. In particular, the regression line intersects the origin. More in particular, the line y=x is taken as regression line, because the (milking) intervals are in principle independent events.

In this case, the (average) distance to said average is preferably taken as a parameter. In the case of a cloud of points for intervals during a period of time in which the intervals should on average be equally long (i.e. for a healthy animal), the distance to the average point can be taken as a distance. A large average distance will then be equal to a cloud having a large diameter. In all cases, and in particular for intervals during a period of time in which the average interval varies visibly, the distance to the regression line advantageously through the origin will preferably be taken as the distance, and more advantageously the line y=x will be taken.

In embodiments, as the threshold value is taken a value between 1 and 3 times the standard deviation. However, in practice, other values are possible as well, in which case, for example, a relatively high threshold value indicates a strong selection, with few messages, which, however, are almost always correct. Here, a farmer can take into account, for example, the occupancy rate of a milking robot, the accommodation, the ranking of a cow, etcetera. These factors can also influence the spread. By way of example, at a high occupancy rate of the robot, a low-ranking cow can be jostled more frequently by a higher-ranking cow, so that the spread for the former cow can be greater without the immediate need of an indication.

In particular, the parameter may comprise a change of the value of another parameter. In this case, an attention indication is generated if said parameter, i.e. change of the other parameter, exceeds a specific threshold. In practice, the occurrence of a, in particular sudden, change is found to be a reliable indicator. Accordingly, exceeding a threshold by the change of the parameter value can be useful. Said threshold may have an absolute value, for example "average milking interval of the last 10 milkings increases or decreases by more than 0.2 hours", but may, for example, also have a relative value, such as an increase or decrease by at least 15%. Of course, other values are possible as well. The parameter comprises advantageously a change in the spread of the intervals. For example, an indication is generated if the spread in intervals during the past N-milkings deviates by more than x % from the spread in the preceding N-intervals.

The method according to the invention is capable already on its own of giving a useful attention indication. Some advantages, in part already mentioned, are that there is only required a time measurement, that can be carried out in a very accurate and reliable manner. The means required for this purpose are almost always already present in the (robotic milking) equipment, so that the complexity is very small and will at any rate hardly or not increase. Another advantage is that a direct measurement on the dairy animal does not take place, so that additional unrest with the dairy animal is excluded. The fact is that the method according to the invention is not able to diagnose, but only to give an indication in this respect. In order to enhance the reliability of this indication, the method further comprises in embodiments the determining of at least one additional attention indicator, preferably an additional mastitis indicator with an associated predetermined additional threshold value, wherein the attention indication is only generated if also the additional indicator exceeds the additional threshold value. It is obvious that, when two preferably mutually independent indicators give an indication of an abnormality, in particular mastitis, the reliability of the attention indication will increase. At any rate the number of false-positive indication will then decrease. Useful additional indicators are, in the case of mastitis, for example the conductivity, the colour or the cell count of the milk, the amount of activity during milking, such as unrest, kicked-off teat cups or connection refusals, etcetera.

In accordance with various aspects of the present invention, if it has been established that at least one from the group of the parameter and the at least one additional attention indicator has exceeded the associated threshold value, at least one of the other from the group of the parameter and the at least one other attention indicator is lowered. This is connected with the following consideration. Abnormalities with human beings are usually very variable in their manifestation and cannot always be characterized univocally. These can often only be established if a series of symptoms are observed. In order to limit the number of false-positive indications, i.e. indications that wrongly designate an abnormality, the one or more predetermined threshold values will usually be selected in a conservative manner, i.e. a large deviation upwards or downwards should occur before it is established that there is an abnormality that should be examined. However, this may result in some cases being missed. In order to reduce these false-negative cases in number, at least another threshold value is lowered when at least one of the established threshold values is exceeded. For, when a threshold value has been exceeded, the probability of an actual abnormality is greater than in the case of non-exceeding. Of course, this idea applies to embodiments in which the total indication is determined on the basis of at least two exceeded threshold values.

The invention also relates to a device for carrying out the method according to the invention on a dairy animal, comprising a visit milking interval modulus, which is configured for measuring a plurality of visit intervals, in particular milking intervals, of said dairy animal to the milking robot, preferably a plurality of successive visit intervals, milking intervals, respectively, a processor which is configured for determining, from the measured visit intervals, milking intervals, respectively, a value of a statistical parameter regarding the measured plurality of visit intervals, milking intervals, respectively, and for generating the attention indication if the value exceeds a predetermined threshold value. One of ordinary skill in the art will appreciate that the device is advantageously incorporated in a milking robot system or, in particular, in an animal management system. For, the management system will usually be the location where visit times, milking times, respectively, and thus visit intervals, milking intervals, respectively, derived therefrom, were already stored. The method can then, for example, be implemented in a computer program product which, when used in a computer, will make the computer carry out the method according to the invention.

In a particular embodiment, the device comprises a sensor configured for determining an additional attention indicator, in particular an additional mastitis indicator, which supplies a signal to the processor if the additional attention indicator, mastitis indicator, respectively, exceeds a predetermined threshold. The sensor is in particular a milk conductivity meter, a milk colour meter, or a cell count meter.

It is emphasized here that particular embodiments of the device according to the invention are characterized by the same features as the corresponding particular embodiments of the methods according to the invention, wherein the processor is in each case configured for said features.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1A:
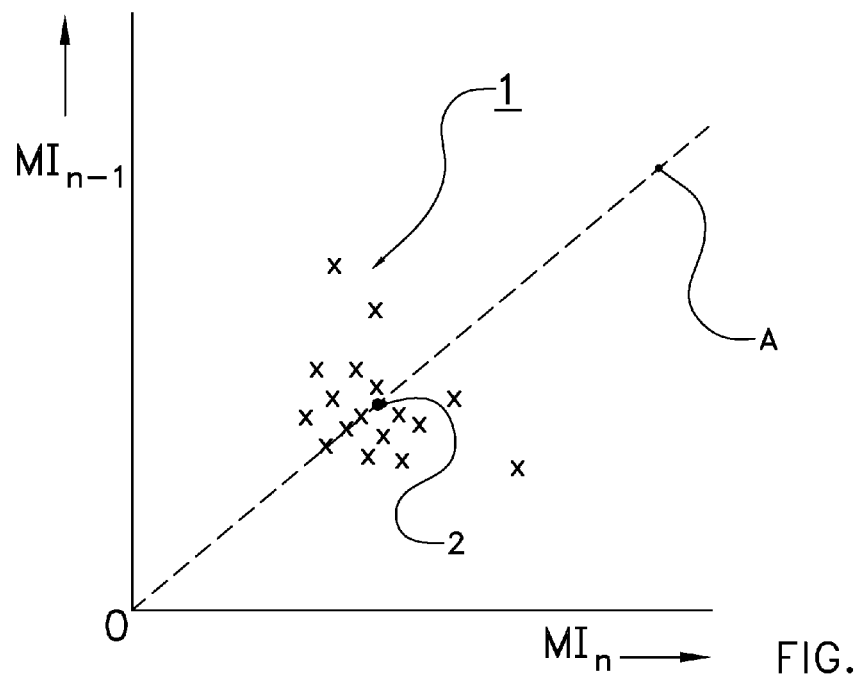
FIGS. 1a, b are schematic diagrams in which successive milking intervals are set out for an irregularly milking cow (a) and a regularly milking cow (b)

The following is a description of certain embodiments of the invention, given by way of example only and with reference to the drawings. In FIGS. 1a and b, for two cows a series of points are set out having as the x-coordinate the measured milking interval MIn, and as the y-coordinate the measured previous milking interval MIn-1 There is thus formed a cloud of points 1, 1' respectively. The average position is denoted by 2, 2' and is formed by the average x-coordinate and the average y-coordinate. Furthermore, by A, B, respectively is denoted a regression line which intersects the origin, and which thus also intersects 2, 2', respectively. For all Figures it is pointed out that it has been decided to use here milking intervals in cases in which, according to the invention, visit intervals could in general have been used as well.

In FIG. 1a the successive milking intervals of an irregularly milking cow are set out. This appears from the dimensions of the cloud of points 1. The points have on average a large distance to the average point 2. Moreover, an outlier is shown, in the form of a very long milking interval, in particular after a milking interval that is rather short. This point forms the outlier below on the right in the diagram. The subsequent milking interval was almost average, and this resulted in the point in the middle above the cloud 1.

The measured points are around the average value 2, which will not have changed, neither theoretically, during the rather short period of time of approximately a week. That is why the regression line A (cfr. B in FIG. 1b), by the origin and the average value, has hardly any significance here.

Figure 1B:
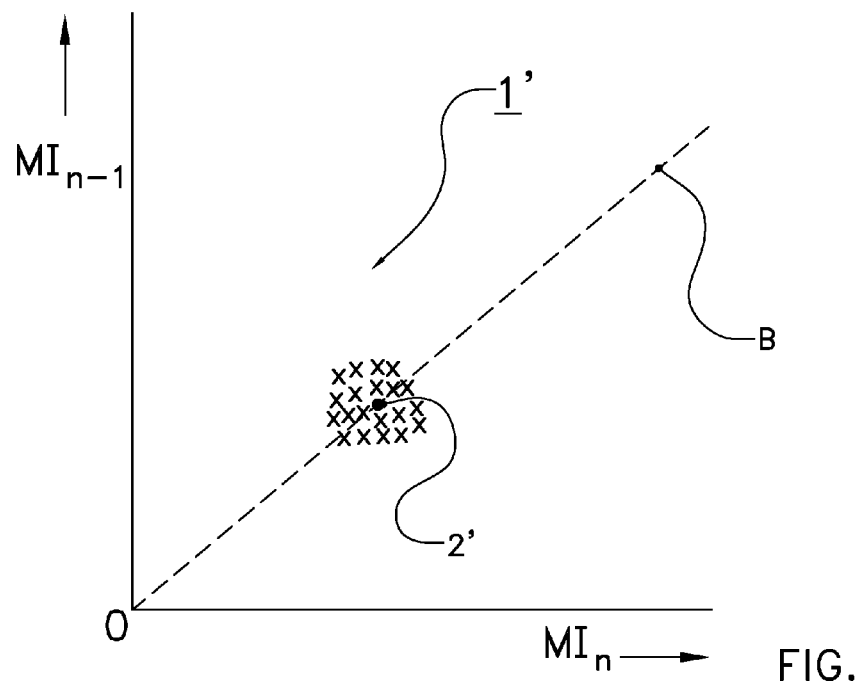

In FIG. 1b, successive milking intervals of a regularly milking cow have been set out at the same scale. The result is again a cloud of points 1' around an average 2'. It is clearly visible that the points are located much closer to each other.

The inventor has discovered that the (ir)regularity is an indication of, in particular, mastitis with the dairy animal. Because the regularity of milking intervals can thus be shown clearly for each animal, the dairy farmer or other supervising person is able to estimate whether a dairy animals needs further attention for mastitis. For, the cloud of points of the cow of FIG. 1a will be significantly broader than that of the cow of FIG. 1b, which is an indication for attention.

Figure 2A:
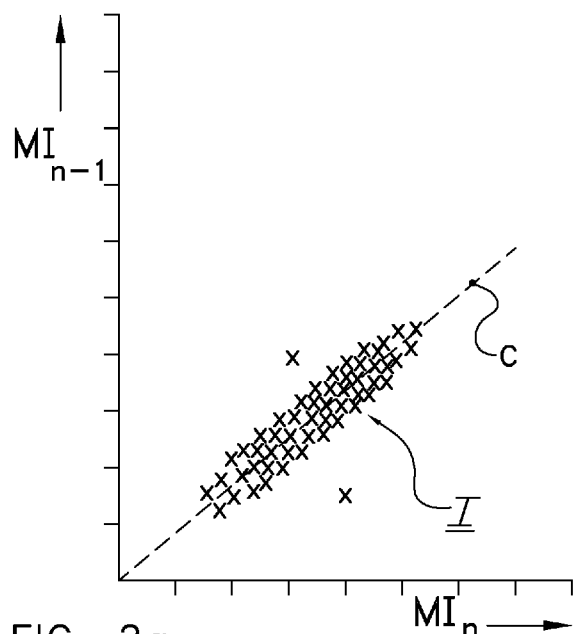
FIGS. 2a, b are like FIGS. 1a, b, but now during a longer period of time of a lactation, and with a respective regression line.

In FIGS. 2a and b, the milking intervals (at least part thereof for the sake of clarity) are set out in the same manner as points (MIn, MIn-1) for a dairy animal during a substantial part of a lactation, in the form of a cloud of points I. The latter has in FIG. 2a the shape of a very narrow ellipse or beam, and in FIG. 2b a much broader ellipse or beam, through which in each case a regression line C, D, respectively, has been drawn.

At a voluntary visit, the average milking interval will change in the course of the lactation, as the milk production changes too. In the beginning, the production will rise rapidly and strongly, so that the number of daily visits will increase, and the average milking interval will consequently decrease. Towards the end of the lactation, the production will again decrease, and the average milking interval will again become longer. As a result thereof, the current cloud of points for milking intervals of e.g. the past week, will move too along the line that represents said average, thus in fact the line y=x. The regression line should then also be the line y=x, and it usually will be, in a first approach.

Figure 2B:
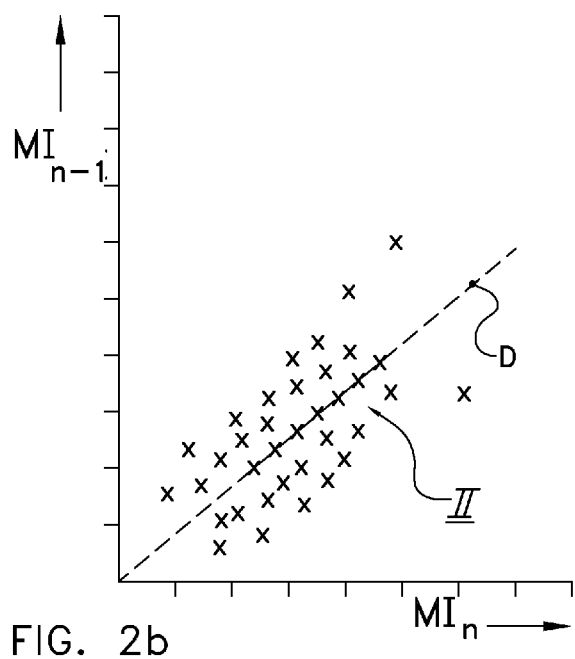

The dairy animal of FIG. 2a meets very well this average behaviour, having as instructive outlier the deviating milking interval based on the outlier on the right below the cloud I, which results itself in the corrective outlier on the left above the cloud, after which the regular series is continued. The dairy animal of FIG. 2b is much more irregular, and the cloud II shows for each milking interval a greater spread, having more, and even more deviating outliers. This gives per se already cause to an attention indication. However, in this case, the method as shown in FIG. 1 does not work very well, because the average can no longer be designated as a point. Neither the simple determination of the standard deviation in the milking intervals works very well for those periods in which the average shifts itself. Of course, it is possible to look at the running average of a shorter period of time, in which the average hardly or not changes, such as the past week. The method described in FIG. 1 can then be followed again.

Figure 3A:
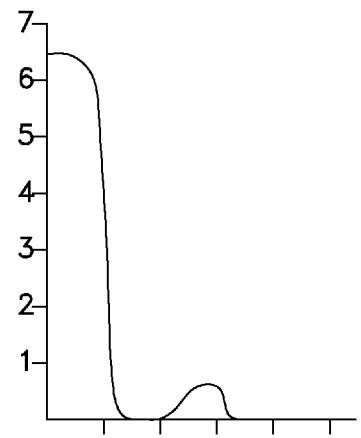
FIGS. 3a, b are the distribution of the distance of the points to the regression line belonging to FIGS. 2a, b.

However, it is useful if a longer period of time can be looked at. For this purpose, the invention provides to look at the deviation of another average, in this case of the regression line y=x. In FIGS. 3a, b, respectively, in each case the frequency distribution of the "distance" is set out, in dimensionless quantities, of a point of the respective cloud to the line y=x. It is clearly visible that the regular dairy animal of FIG. 2a gives rise to a narrow and high peak in FIG. 3a, the two correlated outliers being clearly visible. On the other hand, FIG. 2b, showing the irregularly milking animal, gives rise to a broader, more spread-out peak, in which case the outliers are in fact no longer noticeable.

Figure 3B:
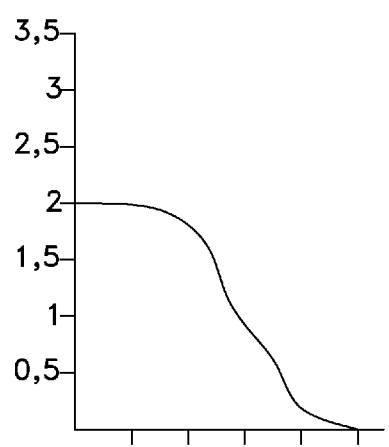

However, in the diagrams of FIG. 3 it is indeed again possible to look at the spread, for example in the form of the standard deviation of the frequency distribution. FIG. 3a will thus show a standard deviation of almost 1, in arbitrary units, while FIG. 3b will show a standard deviation of around 3. This much greater value is, for example, above a limit value of 1.5, and can then give cause to a mastitis attention.

It is pointed out here that looking at the milking intervals over a longer period of time can have two aspects. On the one hand, a spread that is normal for a dairy animal concerned can be determined. For, it is possible that an animal that shows a relatively great spread has nevertheless no mastitis or other abnormality, so that a predetermined threshold value can be adjusted or selected. On the other hand, it is advantageous not to wait a too long period of time before giving attention indications. In such cases, it may be advantageous to work with a running average over a shorter past period of time, such as described above. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An automatic milking device for generating an attention indication for a dairy animal that is kept in an environment with the automatic milking device, wherein the automatic milking device comprises:
    a milking interval module for measuring a plurality of visit intervals of said dairy animal visiting the automatic milking device, and a plurality of milking intervals of said dairy animal,
    a processor configured for determining a value of a statistical parameter regarding the measured plurality of visit intervals, and milking intervals—from previously measured visit intervals and milking intervals of said dairy animal, and for generating the attention indication for said dairy animal, if the value exceeds a predetermined threshold value,
    wherein the attention indication comprises a mastitis alarm signal.

2. The device according to claim 1, wherein the plurality of visit intervals is a successive plurality of visit intervals.

3. The device according to claim 2, wherein the plurality of milking intervals is a successive plurality of milking intervals.

4. The device according to claim 1, further comprising a sensor which is configured for determining an additional mastitis indicator, and which supplies a signal to the processor if the additional mastitis indicator exceeds a predetermined threshold.

* * * * *